B. M. LEECE.
DYNAMO ELECTRIC MACHINE CONTROL.
APPLICATION FILED NOV. 23, 1918.
1,390,452.
Patented Sept. 13, 1921.
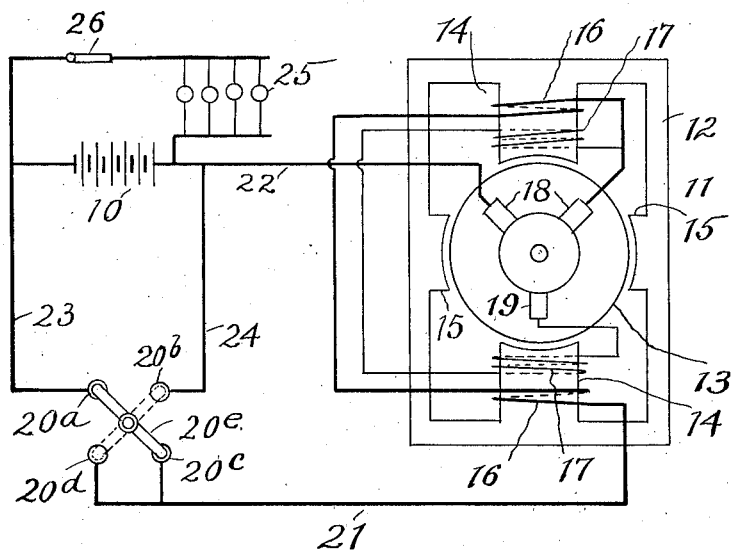
Inventor
Bennett M. Leece
By
Thurston & Rivis
attys

UNITED STATES PATENT OFFICE.

BENNETT M. LEECE, OF CLEVELAND, OHIO, ASSIGNOR TO THE LEECE-NEVILLE COMPANY, OF CLEVELAND, OHIO, A CORPORATION OF OHIO.

DYNAMO-ELECTRIC-MACHINE CONTROL.

1,390,452.          Specification of Letters Patent.    Patented Sept. 13, 1921.

Original application filed December 22, 1913, Serial No. 808,064. Divided and this application filed November 23, 1918. Serial No. 263,851.

*To all whom it may concern:*

Be it known that I, BENNETT M. LEECE, a citizen of the United States, residing at Cleveland, in the county of Cuyahoga and State of Ohio, have invented a certain new and useful Improvement in Dynamo-Electric-Machine Controls, of which the following is a full, clear, and exact description.

This invention relates to the control of dynamo electric machines, and has special utility in lighting or starting and lighting systems used in connection with internal combustion engines of vehicles such as automobiles and boats. This application is a division of my prior application, Serial No. 808,064, filed December 22, 1913, which application resulted in Patent No. 1,286,182, granted November 26, 1918.

The chief object of the invention is to provide improved means for preventing a rise in voltage across the terminals of the main field winding of the machine when the latter is disconnected from the battery. More particularly the invention aims to provide a circuit controlling means which on disconnecting the battery and dynamo electric machine causes a quick collapsing of the field, particularly in a machine whose field is produced by differentially wound coils including shunt coils and opposing series coils.

The invention may be briefly summarized as consisting in certain novel combinations and arrangements of parts described in the specification and set forth in the appended claims.

The single figure of the drawing shows diagrammatically a starting and lighting system embodying my invention although the features of the present invention are not confined to a system having the dual functions of starting and lighting, but have utility in a system employed for lighting or battery charging purposes only.

The system herein shown includes a storage battery 10, and a dynamo electric machine 11. This machine, which is preferably of the four-pole type includes a field member 12, and an armature 13, the field member having two oppositely disposed wound poles 14 and two oppositely disposed short consequent poles 15 which are unwound.

The field windings of the machine include a series winding 16 and a main shunt winding 17. The current traverses these windings in such manner that when the machine is serving as a motor (assuming that it is used for both cranking and battery charging or lighting purposes) the fields produced by the shunt and series field windings are additive or assist each other so as to provide maximum field strength or torque, and when the machine is changed to a generator the current is reversed in the series winding so that the field produced thereby opposes the field produced by the shunt winding with the result that the current passing through the series winding has a regulating action, the opposing and regulating effect varying with the speed.

I utilize two main brushes 18, which are in this case disposed ninety degrees apart, and to which the main conductors extending between the dynamo electric machine and battery are connected. I also utilize an auxiliary brush 19 which is between the main brushes, and I connect one terminal of the shunt field winding to this brush and the other terminal to one of the main brushes. This brush is located in such a position that the voltage, and consequently the current passing through the shunt winding 17 is affected by distortion or shifting of the field due to change in speed. The voltage between the terminals of the shunt field winding is considerably less than the voltage between the main brushes, and if the auxiliary brush is just midway between the brushes 18, the voltage impressed on the shunt field winding will be half that of the voltage between the main brushes. I prefer to mount this auxiliary brush 19 so that it may be adjusted within suitable limits relative to the main brushes circumferentially about the commutator so that the effective voltage which is impressed on the shunt winding and consequently the value of the current passing through the shunt winding may be varied. This admits of variation in current output.

This brush admits of closer regulation than is produced simply by the differential action of the field windings, for when the speed varies there is more or less of a shifting or distortion of the main field flux passing between the armature and the main field poles adjacent said auxiliary brush, and this tends to vary the voltage between the auxiliary brush and the coöperating main brush inversely with the speed.

By impressing on the terminals of the shunt winding a voltage which is low relative to the armature voltage and by accomplishing this with an auxiliary brush which affords the regulating action, I am enabled to use in the shunt winding a large conductor and pass through the winding a current which even at low speeds saturates the field. In consequence, I need not employ a large number of turns in the shunt winding; the size of the machine as a whole can be made quite small, and the machine will begin to generate at a low engine speed.

In the control of the machine, I utilize a switch which not only serves to connect and disconnect the dynamo electric machine 11 and storage battery 10, but has an additional important function. This switch, as here shown, has four contacts $20^a$, $20^b$, $20^c$ and $20^d$, and is provided with a movable switch member $20^e$, which is pivoted between its ends and is adapted to be moved to a position such as to engage and bridge the contacts $20^a$ and $20^c$, or to engage and bridge the contacts $20^b$ and $20^d$.

It will be observed by tracing the circuits, that connection is made from one of the main brushes 18 to the series winding on one pole, then to the series winding on the opposite pole, and then connection is made by a conductor 21 and suitable branch conductors to contacts $20^d$ and $20^c$, and that connection is made from the other main brush 18 by conductor 22 to one terminal of the battery, the opposite terminal of the battery being connected by conductor 23 to contact $20^a$. Also the contact $20^b$ of the switch is connected by conductor 24 to the conductor 22 at a point between the battery and the dynamo electric machine. At 25 are shown in conventional manner, the lamps of the lighting circuit which are connected or may be connected through a suitable switch 26 to the battery-dynamo-electric machine circuit, so that said lighting circuit may receive current from either the battery or generator.

In consequence, when the switch is in the position shown in the drawing, the battery and dynamo electric machine are connected, and if it is moved to this position, with all parts idle, the machine will serve as a motor to crank the engine, and as soon as the engine is started, it will drive the dynamo electric machine, and when the voltage of the machine exceeds that of the battery, the machine will begin charging the battery. If now, it is desired to render the current generating apparatus inoperative, while the engine is running, the movable switch member is moved to the position shown by dotted lines so as to engage the contacts $20^b$ and $20^d$. When the switch is shifted to this position, not only does it disconnect the battery and dynamo electric machine, but it short circuits the machine, and thus eliminates all danger of the voltage in the shunt winding building up and of the winding burning out, as might be the case if the machine were run idle on open circuit.

When this switch short circuits the machine, the field is instantly collapsed or killed for the reason that the voltage between the terminals of the shunt winding is greatly reduced, and while the short circuiting of the generator has a tendency to increase the ampere turns of the series winding, this assists in the collapsing of the field due to the fact that the field produced by the series winding opposes that produced by the shunt winding.

Thus the circuit controlling and short circuiting switch has special utility in a differentially wound machine having a series winding which during generation produces a field opposing that produced by the shunt winding, and in practice the invention has proven to be especially efficacious in a third brush differentially wound machine such as herein illustrated and described wherein the voltage across the terminals of the shunt field winding is a fraction of the main terminal voltage.

The engine may drive the dynamo electric machine or be driven thereby in any suitable manner, but preferably through a single power transmitting agency consisting of chain and sprocket gearing connecting or extending between the engine crank shaft or a continuation thereof and the shaft of the dynamo electric machine.

Having described my invention, I claim:

1. In a system such as described, a storage battery, a dynamo electric machine for charging the same and provided with differential series and shunt field windings, and switching means for short circuiting the dynamo electric machine and disconnecting the latter from the battery.

2. In a system such as described, a storage battery, a dynamo electric machine for charging the same, said dynamo electric machine having main brushes and an auxiliary brush and having a main shunt field winding connected between the auxiliary brush and one of the main brushes, a series field winding which when the machine is generating produces a field opposing the field produced by the shunt winding, and switching means for connecting and disconnecting the battery and dynamo electric machine and for short circuiting the latter when it is disconnected from the battery.

3. In a starting and lighting system adapted to be employed in connection with an internal combustion engine, a battery, a dynamo electric machine adapted to serve as a motor to crank the engine and to be driven by the engine as a generator, said dynamo electric machine having differentially wound field coils, and a controlling switch in the battery-dynamo electric machine circuit and having connections for short circuiting the dynamo electric machine when the latter is disconnected from the battery.

4. In a starting and lighting system adapted to be employed in connection with an internal combustion engine, a third brush differentially wound dynamo electric machine adapted to serve as a motor to crank the engine and as a battery charging and lighting generator after the engine is started, a storage battery, a switch for connecting the machine to and disconnecting it from the battery, and having connections for short circuiting the machine when it is disconnected from the battery.

5. In a starting and lighting system adapted to be employed in connection with an internal combustion engine, a dynamo electric machine adapted to serve as a motor to crank the engine, and then to be driven as a generator, said dynamo electric machine having main brushes and an auxiliary brush, and a field member having a shunt winding and a series winding, the former being connected between one of the main brushes and the auxiliary brush, the said windings producing fields which assist each other when the machine is serving as a motor, and which oppose each other when the machine is serving as a generator, in combination with a storage battery adapted to supply current to the machine when it is serving as a motor, and adapted to be charged by the machine when it is serving as a generator, and means for connecting and disconnecting the battery and dynamo electric machine and for protecting the shunt field winding against abnormal voltage between its terminals.

6. In a starting and lighting system adapted to be employed in connection with an internal combustion engine, a battery, a third brush current output regulated dynamo electric machine driven at variable speed by the engine for charging said battery, a circuit from the dynamo electric machine to the battery, and switch means intercalated in said circuit for disconnecting said dynamo electric machine from said battery and concomitantly forming a conducting path between the terminals of said dynamo electric machine.

In testimony whereof I hereunto affix my signature.

BENNETT M. LEECE.